Oct. 25, 1955
M. H. GROVE ET AL
2,721,576
FLUID PRESSURE REGULATOR
Filed July 9, 1951
2 Sheets-Sheet 1
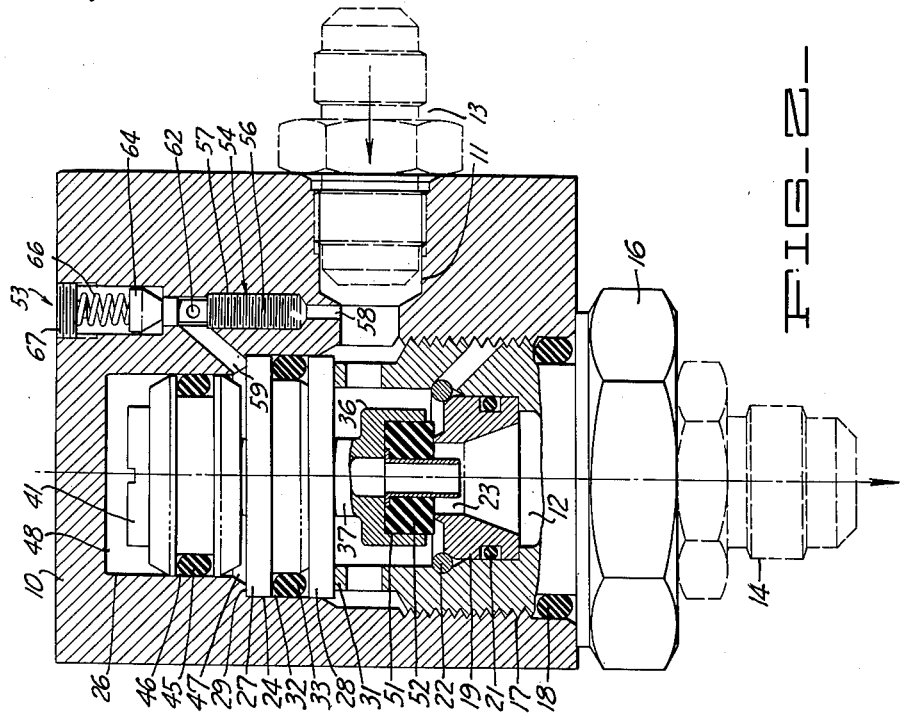
FIG_2
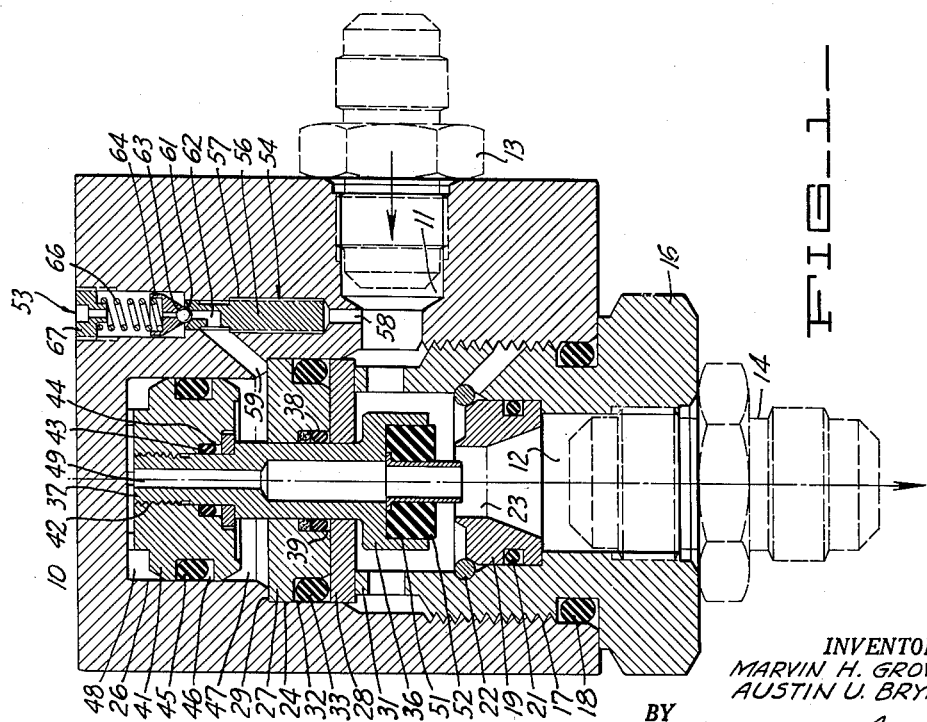
FIG_1
INVENTORS
MARVIN H. GROVE
AUSTIN U. BRYANT
BY
*Flehr & Swain*
ATTORNEYS

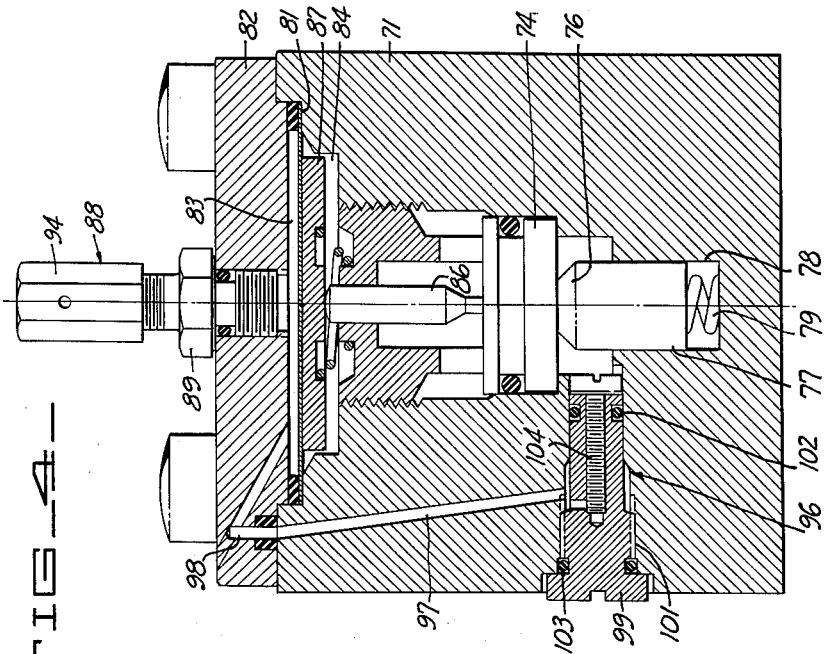

United States Patent Office 2,721,576
Patented Oct. 25, 1955

2,721,576

FLUID PRESSURE REGULATOR

Marvin H. Grove, Piedmont, and Austin U. Bryant, Berkeley, Calif., assignors to Grove Valve and Regulator Company, Oakland, Calif., a corporation of California Application July 9, 1951, Serial No. 235,732

3 Claims. (Cl. 137—505.28)

This invention relates generally to fluid flow control devices, and particularly to regulators serving to control flow of air or other gases.

Fluid pressure regulators of the gas loaded type, as exemplified by the regulator disclosed in Grove 2,047,101, employ a loading chamber upon one side of the operating diagram which is adapted to contain a predetermined amount of trapped gas under pressure. While gas loaded regulators are particularly desirable where a wide range of adjustment is desired, and where the pressures being handled may be relatively high (e. g. of the order of 1000 p. s. i. or more) they have certain inherent disadvantages. Particularly the pressure of the trapped gas varies with changes in temperature, and therefore the resulting changes in loading force upon the operating diaphragm cause substantial inaccuracies in the desired regulation. For example, if the temperature of a gas loaded pressure reducing regulator increases, due to surrounding atmospheric or other conditions to which it is subjected, or to an increase in the temperature of the gas being handled, the loading pressure increases to cause a corresponding increase in the outflow pressure being maintained. It is possible to alleviate this difficulty to some extent by connecting the loading chamber of the regulator to an external pressure flask, which can be isolated from temperature changes. However, it is not always feasible or possible to use such an external flask pressure chamber, particularly when it is designed to provide a small compact regulating device on portable equipment. Another expedient is to connect the loading chamber of the regulator to the discharge side of a small loading regulator such as shown in Grove et al. 2,342,659. This arrangement has the same disadvantages as the separate pressure flask, and in addition it requires the use of a separate source of air supply.

It is an object of the present invention to provide automatic means for loading regulators of the above character, which will provide a compact regulator that is substantially immune to temperature changes.

Another object of the invention is to provide a regulator of the above character that has inherent restraining action to prevent chattering of the valve member upon its seat.

Additional objects of the invention will appear from the following description in which the preferred embodiments have been set forth in detail in conjunction with the accompanying drawing.

Referring to the drawing:

Figure 1 is a side elevational view in section illustrating one form of regulating device incorporating the present invention, with the valve member shown in open position.

Figure 2 is a view like Figure 1 but showing the valve member in closed position.

Figure 3 is a side elevational view in section illustrating another embodiment of the invention.

Figure 4 is a cross-sectional view taken along the line 4—4 of Figure 3.

The pressure reducing regulator illustrated in Figure 1 consists of a body 10 provided with the inflow and outflow passages 11 and 12. These passages are adapted for connection to inflow and outflow piping 13 and 14. The passage 12 can be formed in a fitting 16 which has a threaded engagement 17 with the body. Leakage past the fitting is prevented by suitable means such as the resilient O ring 18.

The fitting 16 serves to mount the stationary seat ring 19, which is sealed by suitable means such as the resilient O ring 21, and which is held in place by the snap-in retaining ring 22. The orifice 23 through the seat ring 19 serves to connect the inflow and outflow passages, when the associated valve member is in open or partially open position.

The interior of the valve body is machined to provide the two cylindrical bores 24 and 26. The bore 24 accommodates a rigid annular plate or disc 27, together with disc 28, which can be of lighter construction than disc 27. These parts are clamped into engagement with the body shoulder 29 by the inner end portion 31 of the fitting 16. The periphery of disc 27 is provided with a recess 32, which provides, together with disc 28, an annular groove for accommodating the resilient O ring 33. This O ring forms a seal between the member 27 and the body.

A valve member 36 is disposed adjacent the stationary valve seat and is carried on one end of the valve stem 37. This stem is machined to snugly fit aligned openings in the discs 27 and 28. Suitable sealing means is provided by the resilient O ring 38, which is accommodated in the recess 39.

A fluid pressure operated member in the form of a piston 41 is slidably fitted within the cylindrical bore 26, and is attached to the adjacent end of the stem 37. Thus the piston has a threaded engagement 42 with the stem, and leakage between the piston and the stem is prevented by the resilient O ring 43, which is accommodated within the recess 44. The piston 41 is sealed with respect to the body by the resilient O ring 45, which is accommodated within the annular groove 46.

With the construction just described spaces or chambers 47 and 48 are provided on opposite sides of the piston 41. The chamber 48 is in communication with the outflow side of the device, through the passage or duct 49 that extends axially through the valve stem 37. The chamber 47 is connected to automatic loading means as will be presently described in detail.

The valve member 36 can be formed in accordance with the type of service to which the regulator is to be used. In the construction illustrated the valve member is provided with a recess 51 to accommodate the valve insert 52. This insert can be formed of suitable material such as "nylon."

Mounted upon the body 10 there is small back pressure regulating device 53, together with flow restricting orifice means 54. The orifice means provides a flow restricting orifice of relatively small effective cross-sectional flow area, which serves to effectively connect the inflow passage 11 with the chamber 47. Such an orifice can be formed by the threaded screw-like plug 56, which engages a threaded bore 57 formed in the body. The threaded bore 57 is connected by duct 58 to the inflow passage 11, and by duct 59 with the chamber space 47. The interfitting threads form an attenuated orifice which can be adjusted by turning the plug 56.

One end of the plug 56 is formed to provide the stationary valve seat 61, the orifice of which is in communication with the passage 59 through the duct 62. The valve member 63 that cooperates with seat 61 can be in the form of a small ball as illustrated. The ball is associated with a ball retainer 64 which is urged in one direction by the compression spring 66. By turning the threaded member 67 the compression of spring 66 can be adjusted to adjust the loading force upon the valve ball 63.

Operation of the regulator illustrated in Figure 1 is as follows: Assuming that the inflow passage 11 is connected to a high pressure source of air or gas, and that the piping 14 is connected to a low pressure system to which the gas is to be supplied at substantially constant pressure, the piston 41 is moved to position the valve member 36 for automatic regulation of the flow through orifice 23. Gas from the inflow passage 11 flows through the restricted orifice formed by the threaded plug 56, and serves together with the back pressure regulating device 53 to maintain a substantially constant gas loading pressure in the chamber space 47. Loading spring 66 is adjusted whereby at the loading pressure desired for the chamber 47, gas is substantially continuously bled past the seat 61, to discharge to atmosphere. In the event there is a substantial change in temperature of the gas in chamber 47, there is no change in the loading pressure, because loading spring 66 is substantially unaffected by temperature changes.

Assuming that the regulator has been in a static condition and that no gas pressure has been applied to the inflow passage 11, application of a relatively high pressure to the inlet passage causes gas to flow through the orifice means 54 while the back pressure regulating device 53 remains closed. A loading pressure is rapidly built up in the chamber 47 until a value is reached for which the back pressure regulating device 53 has been set. Hereafter the operation is the same as previously described. Rapid build-up of pressure in chamber 47 is aided because of its small size or volume.

Previous reference has been made to the fact that when the valve member 36 is closed upon the seat ring 19, the clearance ring represented by the chamber 47 is relatively small. In other words, one side of the piston is in close proximity with the adjacent face of member 27. This arrangement, together with the orifice means 54 and the back pressure regulating device 53, provides a novel combination which eliminates the necessity of utilizing a relatively large dome chamber, and which at the same time provides for proper restraint of the piston to prevent chattering of the valve member upon the stationary seat. These effects can be better understood by pointing out that when the valve member 36 is operating in close proximity with the stationary seat, the chamber 47 is of minimum dimensions and therefore there is a restraint against sudden movement of the piston 41 away from the disc 27. Any such sudden movement causes a relatively great momentary change (i. e. reduction) in pressure in the chamber 47, which in turn tends to prevent sudden movement of the piston. Rapid movement of the piston from closed to open valve positions is subject to restraint because under such conditions the back pressure regulating device 53 is closed and gas which is drawn into chamber 47 flows through the orifice means 54. Rapid movement of the piston from full open to closed position rapidly displaces gas from the chamber 47. Such displacement does not result in any material increase in chamber pressure because such displaced gas is vented through the back pressure regulating device 53.

In order to adjust the regulating device to vary the outflow pressure being maintained it is only necessary to adjust the member 67 to thereby vary the compression of spring 66.

In the embodiment of Figures 3 and 4 a diaphragm is used in place of the piston 41. Thus in this case there is a body 71 provided with the inflow and outflow passages 72 and 73. Within the body there is a stationary seat ring 74 which cooperates with the movable valve member 76. The valve member is carried by the guide tube 77 that operates in the body bore 78 and surrounds the compression spring 79. A flexible fluid pressure operated diaphragm 81 has its peripheral edge portion clamped between the body and the plate 82. There is a relatively small loading chamber 83 formed between the diaphragm and the adjacent side of the plate 82, and on the other side of the diaphragm the body is formed to provide the chamber 84. This chamber is connected to the outflow passage by means of suitable ducts 85. A valve push rod 86 is guided within the body and has its one end engaging the diaphragm plate 87, and its other end engaging the valve member 76.

Mounted upon the plate 82 there is a back pressure regulator device 88 which is similar to the device 53 of Figure 1. It consists of a fitting 89 threaded into the plate 82 and which forms a stationary valve seat 91 for the ball valve member 92. The ball valve is urged against the seat by the loading spring 93, and this spring can be adjusted by turning the threaded cap 94.

A flow restricting orifice means 96, corresponding to the orifice means 54 of Figure 1, is mounted on the body and is in communication with the space 83 through the ducts 97 and 98. The orifice means consists of a screw-like plug 99 which has a threaded connection 101 with the body. The extremities of this member are sealed with respect to the body as by means of the resilient O rings 102 and 103. The space between these O rings is in communication with duct 97. The plug 99 is bored and threaded to receive the adjustable screw 104. The threaded engagement of this screw with the plug 99 forms an attenuated orifice, one end of which is in communication with the duct 97, and the other end with the inflow passage 72.

Operation of the embodiment illustrated in Figures 3 and 4 is substantially the same as Figure 1. Normally the back pressure regulator device 88 can be set to maintain a desired gas pressure loading upon the diaphragm 81, and at the same time the diaphragm is restrained against violent movements such as cause chattering of the valve member against its associated seat. Likewise, in this instance a loading dome or like chamber is eliminated.

It will be apparent that the present invention makes possible the construction of a compact pressure reducing regulator which is not dependent upon use of an external flask or loading device. Its operation is substantially independent of changes in temperature and it is not necessary for loading pressure to be maintained over long periods of time, corresponding to periods when the regulator is not in use.

By way of example, one pressure reducing regulator was made as illustrated in Figure 1, and operated satisfactorily with inflow pressures ranging from 500 to 2000 p. s. i., and with an outflow pressure adjustable within the range of from 200 to 1000 p. s. i. The valve orifice 23 was about 5/32 of an inch in diameter, the piston 41 one half inch in diameter, and the valve travel 1/16 of an inch. For its one extreme position, corresponding to closed position of the valve member 36, the one end face of the piston 41 was about 1/64 of an inch from the adjacent face of the disc 27. The attenuated orifice provided by the threaded engagement of plug 56 with the body, corresponded to a drilled opening of about .005 inch in diameter. Upon applying an inflow pressure of about 2000 p. s. i., full loading pressure was applied to chamber 47 to place the device in operation within a fractional part of a second.

We claim:

1. In a fluid pressure regulator, a valve body having inflow and outflow passages, a stationary valve seat carried by the body and having an orifice therethrough serving to connect the inflow and outflow passages, a movable fluid pressure operated member, a valve member cooperating with the valve seat and movable between open and closed positions with respect to the same, means forming an operative connection between the fluid pressure operated member and the valve member to move the latter between open and closed positions, means carried by the body and serving to enclose said member to thereby form fluid chambers upon opposite sides of the same, gas loading pressure applied to one of said chambers serving to urge said member in a direction to move the valve member toward open position, said one chamber when the valve is in the closed position having a dimension in the direction of movement of said member which is a minor fraction of the total movement of said member in moving the valve member between closed and full open positions, the other one of said chambers being in communication with the outflow side of the regulator, and means for automatically maintaining a loading pressure in said one chamber, said means including a duct extending from the inflow passage to said first named chamber, means forming an attenuated flow restricting orifice in said duct to establish continuous restricted communication between the inflow passage and said first named chamber through said duct, and a back pressure regulator in continuous and direct communication with said one chamber and serving to vent off fluid pressure from the same when said fluid pressure exceeds a given maximum value, the total volume of the fluid space serving to connect the orifice and back pressure regulator to said one chamber being relatively small compared to the volume of said one chamber when the valve is in full open position.

2. A regulator as in claim 1 in which the fluid pressure operated member is a piston slidably fitted with a cylinder formed in the body.

3. A regulator as in claim 1 in which the fluid pressure operated member is in the form of a diaphragm.

References Cited in the file of this patent

UNITED STATES PATENTS

| | | |
|---|---|---|
| 268,368 | Lacy | Nov. 28, 1882 |
| 895,426 | Cable | Aug. 11, 1908 |
| 2,047,101 | Grove | July 7, 1936 |
| 2,164,095 | Thomas | June 27, 1939 |
| 2,212,709 | Grove | Aug. 27, 1940 |

FOREIGN PATENTS

| | | |
|---|---|---|
| 4,753 | Switzerland | Dec. 16, 1893 |